UNITED STATES PATENT OFFICE.

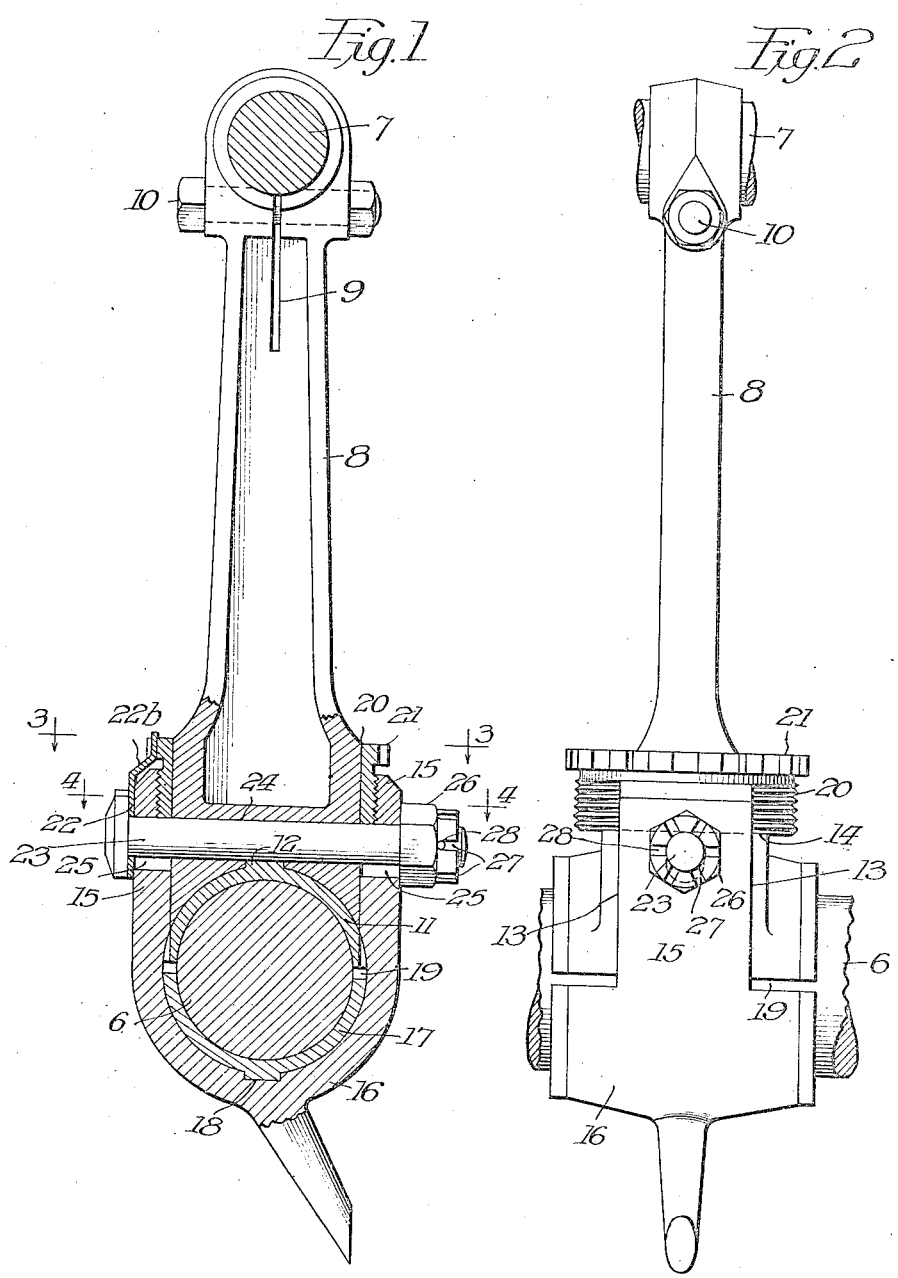

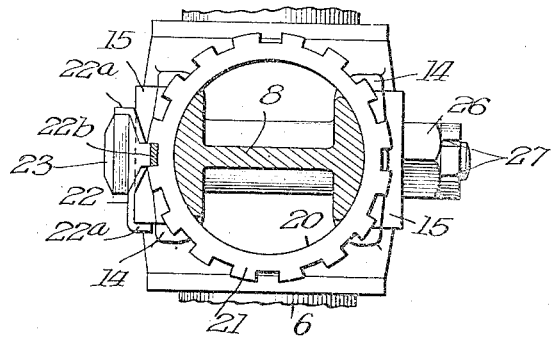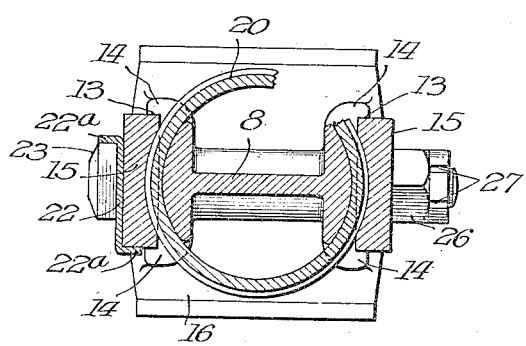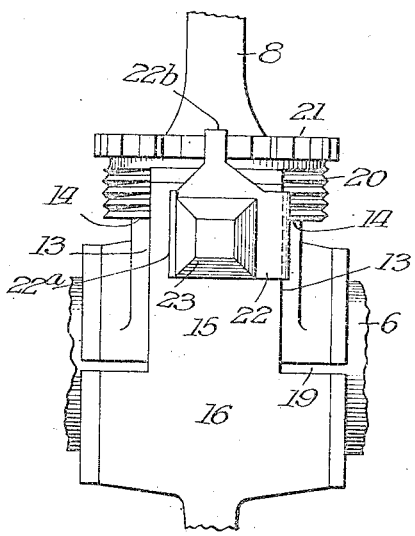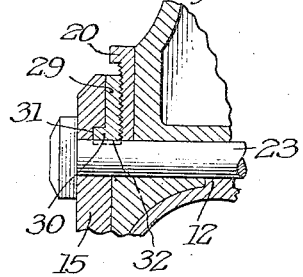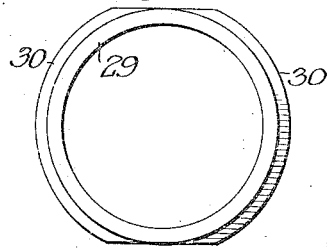

ALFRED KRIEG, OF MINNEAPOLIS, MINNESOTA, ASSIGNOR TO EMERSON-BRANTINGHAM COMPANY, OF ROCKFORD, ILLINOIS, A CORPORATION OF ILLINOIS.

CONNECTING-ROD.

1,253,841.  Specification of Letters Patent.  Patented Jan. 15, 1918.

Application filed March 26, 1917. Serial No. 157,542.

*To all whom it may concern:*

Be it known that I, ALFRED KRIEG, a citizen of the United States, residing at Minneapolis, in the county of Hennepin and State of Minnesota, have invented certain new and useful Improvements in Connecting-Rods, of which the following is a specification.

This invention relates to improvements in connecting rods for engines, the improvements having been designed more particularly, although not exclusively, for embodiment in gas engines. The principal object of the invention is to provide an improved means for connecting the lower or outer end of the connecting rod to the crank shaft of the engine so that compensation for wear may be readily and easily made through relative adjustment of the two half bearings of the connecting rod on the crank pin of the crank shaft.

A further object is to provide an adjustable bearing of the character mentioned, having a construction such that it will be held firmly in any adjusted position and will not be liable to be accidentally worked loose.

A still further object is to provide an adjustable connection of a connecting rod to a crank shaft, that shall be simple in construction and shall avoid the use of shims, wedges, and similar devices which easily work loose and get out of place, owing to the jars and vibration to which the structure is subjected under the high speed of the engine.

Other objects and advantages of the invention will be apparent to those skilled in the art, upon a consideration of the following description taken in connection with the accompanying drawings wherein I have illustrated a practical and preferred mechanical embodiment of the invention, and in which—

Figure 1 is a view partly in elevation and partly in vertical section through the piston pin, crank shaft and connecting rod.

Fig. 2 is an elevational view similar to Fig. 1 at right angles to the latter figure.

Figs. 3 and 4 are cross-sectional views on the corresponding lines of Fig. 1.

Fig. 5 is a fragmentary elevational view as seen from the left of Fig. 1.

Figs. 6, 7, and 8 are detail views illustrating a modification.

Referring to the drawings, 6 designates the offset crank pin portion of an engine shaft and 7 designates the usual cross pin located in the hollow piston or plunger of a gas engine, and 8 designates the connecting rod or pitman. The connecting rod 8 at its upper end embraces the pin 7, preferably having a longitudinal split 9 whereby it may be mounted on the pin 7 with capacity for tightening to take up wear by means of an adjusting bolt 10, as usual in this class of devices.

Referring now to the means for adjustably mounting the lower end of the connecting rod on the crank shaft 6, the lower or crank-engaging end of the rod proper is widened and formed with a semi-circular concave end surface adapted to receive the upper half bearing or bushing 11 that is preferably secured in place by the lug 12. The widened lower end of the rod 8 further has formed thereon, and on opposite sides thereof, a pair of vertical guides or slideways 13 having square upper ends or shoulders 14, best shown in Fig. 4. Slidably engaging the guides 13 are the parallel upstanding arms 15 of a U-shaped saddle member or strap 16, which latter carries the lower half bearing 17, secured therein by a lug 18. The half bearings 11 and 17 are each slightly less than semi-cylindrical in form, thereby leaving a limited space 19 between their proximate edges for purposes of adjustment.

The upper ends of the arms 15 are internally threaded, as best shown in Figs. 1 and 4, and these threaded ends are engaged by a tightening nut in the form of an exteriorly threaded collar 20 that is slidably mounted on the rod 8, as clearly shown in Fig. 4. The lower end of the collar or nut 20 has a thrust engagement with the shoulders 14 formed on the lower hub portion of the connecting rod, and the upper portion of said collar is formed with a peripherally notched rim or flange 21 adapted to be engaged by a lock 22.

From the foregoing description, it will be apparent that whenever it is necessary to take up wear between the crank shaft and its half bearings 11 and 17, by withdrawing the lock 22 the nut 20 may be readily turned, thereby simultaneously and equally drawing up the saddle or strap 16 and forcing down the lower end or hub of the connecting rod, thus bringing the half bearings 11 and 17 into correct relation to the crank 6.

In order to prevent disengagement of the coöperating threaded portions of the arms 15 and nut 20, as well as to additionally lock said parts securely in adjusted position, I provide a clamp bolt 23 which extends through a transverse hole 24 in the lower end of the rod 8 and also through vertical slots 25 in the arms 15; said bolt being provided with a lock nut 26 having notches 27 to receive a cotter pin 28. The lock 22 may consist of a sheet metal strip apertured to engage the bolt 23 just inside the head of the latter, this strip being provided with oppositely extending lateral flanges 22$^a$ engaging a flat side of the bolt head and a vertical edge of the arm 15, respectively, to prevent turning, and a tongue 22$^b$ adapted to engage one of the notches of the rim or flange 21 of the nut 20. When the clamping bolt 23 is employed, in order to effect adjustment the cotter pin 28 is withdrawn and the nut 26 loosened sufficiently to release the lock 22, whereupon relative inward movement of the two half bearings is effected by turning up the main adjusting nut or collar 20 in the manner already described; the clamp bolt 23 being again tightened and the lock 22 restored to operative position when this has been done.

Figs. 6, 7 and 8 illustrate a modification designed to distribute the strain over the entire threaded surface of the tightening nut instead of over limited areas on opposite sides thereof. This is accomplished through the agency of an internally threaded collar 29 that has threaded engagement with the tightening nut 20 and also has on its lower edge external flange sections 30 that engage undercut grooves 31 in the inner faces of the arms 15 of the saddle member 16. The collar 29 is locked against turning by the engagement of the clamp-bolt 23 with a shallow groove 32 on the lower face of the collar.

It will thus be seen that my present improvement comprises comparatively few parts, and that said parts are manipulated in a simple and easy fashion in order to effect the necessary adjustment of the connecting rod on the crank shaft to compensate for wear. Without, therefore, limiting myself to the exact construction shown and described—

I claim:

1. In a structure of the class described, the combination with a crank shaft and a connecting rod provided with a half bearing at its crank-engaging end, of a U-shaped strap or saddle provided with a coöperating half bearing, a tightening nut having a screw-threaded connection with one of said parts and a thrust engagement with the other, whereby upon tightening said nut said parts are drawn together and means for clamping said nut and strap together independently of the longitudinal position of said nut.

2. In a structure of the class described, the combination with a crank shaft and a connecting rod provided with a half bearing at its crank-engaging end, of a U-shaped strap or saddle provided with a coöperating half bearing, a tightening nut having a screw-threaded connection with one of said parts and a thrust engagement with the other, and a clamp bolt passing through the crank-engaging end of said rod and the sides of said strap.

3. In a structure of the class described, the combination with a crank shaft, of a connecting rod provided with a half bearing at its crank-engaging end and with shoulder portions on opposite sides of said crank-engaging end, a U-shaped strap or saddle provided with a coöperating half bearing and internally threaded at the free end portions of its arms, an externally threaded tightening nut embracing the crank-engaging end of said rod and having a thrust bearing on said shoulder portions, said nut also having threaded engagement with the internally threaded free ends of said arms and means for maintaining said nut and arms in coöperative engagement.

4. In a structure of the class described, the combination with a crank shaft, of a connecting rod provided with a half bearing at its crank-engaging end and with shoulder portions on opposite sides of said crank-engaging end, a U-shaped strap or saddle provided with a coöperating half bearing and internally threaded at the free end portions of its arms, an externally threaded tightening nut embracing the crank-engaging end of said rod and having a thrust bearing on said shoulder portions, said nut also having threaded engagement with the internally threaded free ends of said arms, and a clamp bolt extending transversely through said arms and the crank-engaging end of said rod.

5. In a structure of the class described, the combination with a crank shaft, of a connecting rod provided with a half bearing at its crank-engaging end and with longitudinal guides on its opposite sides terminating in shoulder portions, a U-shaped strap or saddle provided with a coöperating half bearing, the parallel arms of said strap slidably engaging said guides and being internally threaded at their free ends, an externally threaded tightening nut embracing the crank-engaging end of said rod and having a thrust bearing on said shoulder portions, said nut also having threaded engagement with the internally threaded free ends of said arms and means for preventing disengagement of said nut and arms.

6. In a structure of the class described, the combination with a crank shaft, of a connecting rod provided with a half bearing at its crank engaging end and with longitudinal guides on its opposite sides terminating in shoulder portions, a U-shaped strap or saddle provided with a coöperating half bearing, the parallel arms of said strap slidably engaging said guides and being internally threaded at their free ends, an externally threaded tightening nut embracing the crank-engaging end of said rod and having a thrust bearing on said shoulder portions, said nut also having threaded engagement with the internally threaded free ends of said arms, and a clamp bolt extending transversely through said arms and the crank-engaging end of said rod.

ALFRED KRIEG.

Copies of this patent may be obtained for five cents each, by addressing the "Commissioner of Patents, Washington, D. C."